HIGH SPEED INFORMATION STORAGE SYSTEM

Filed Jan. 11, 1961 4 Sheets-Sheet 1

INVENTOR
WILLIAM A. EDSON.
BY
Louis P. Elbinger
ATTORNEY.

INVENTOR.
WILLIAM A. EDSON.
BY
ATTORNEY.

INVENTOR.
WILLIAM A. EDSON.
BY Lewis P. Elbinger
ATTORNEY.

Oct. 4, 1966 W. A. EDSON 3,277,450

HIGH SPEED INFORMATION STORAGE SYSTEM

Filed Jan. 11, 1961 4 Sheets-Sheet 4

INVENTOR.
WILLIAM A. EDSON.
BY
Lewis P. Elbinger
ATTORNEY.

United States Patent Office 3,277,450

Patented Oct. 4, 1966

3,277,450

HIGH SPEED INFORMATION STORAGE SYSTEM

William A. Edson, Los Altos Hills, Calif., assignor to General Electric Company, a corporation of New York Filed Jan. 11, 1961, Ser. No. 82,036
23 Claims. (Cl. 340—173)

This invention relates to information storage and more particularly to apparatus for storing at high speed information encoded in binary digital form.

In the processing of information, such as data, various logical and arithmetic operations are performed thereon. These operations are performed at relatively high speeds by the more modern data processing systems, which are primarily electronic, that is, these systems operate on electrical signals representing data by means of electron tubes, diodes, and transistors. A means for storing information, such as register or a memory, is a necessary part of these data processing systems. Such storage means must be capable of accepting the electrical signals from various parts of the processing system and returning signals to the processing system in a form recognizable as information and at a time determined by the operation being performed. It has been found by experience that these electronic data processing systems are most reliable when the electronic portions thereof need handle only data which is basically in binary digital form. In binary digital processing systems, each element of information, termed a "bit," is represented by either a "1" or a "0." These bits of information may be represented by the presence or absence of electrical signals at specified locations in the processing system at predetermined times; for example, an electronic gate may be "opened" at a particular time by a system "clock" signal and if there is an input data signal applied to the gate at that moment, the numeral 1 is said to be present, whereas if there is no input signal applied to the gate, the numeral 0 is said to be present. Thus, storage systems utilized in data processing systems store bits of information which may be retrieved by sensing the presence or absence of an electrical signal in a particular location of the storage system.

Inasmuch as it is desirable to operate data processing systems at high rates of speed, the previously mentioned "clock" signals must recur at a rapid rate. This rate of recurrence is known as the "clock rate." In a typical prior art electronic data processing system, a "clock rate" of 100,000 clock signals per second is employed, and consequently, the data signals appearing at various utilization locations in such a system must represent 100,000 bit per second. Thus, the duration of the electrical signal representing binary "1" must be very short (in the above example, less than 10 microseconds duration) and hence, this signal is actually an electrical pulse. The simulation of binary digital data by the presence and absence of electrical pulses may be termed the "pulse no-pulse" representation.

Since it is desirable to process data at higher rates of speed, an increase in the clock rate of the system is mandatory. However, data processing systems utilizing electron tubes, diodes, or transistors, are limited by the maximum frequencies at which the enumerated elements can effectively amplify or transmit the electrical signals. If the clock rates are increased greatly, for example, to the microwave region of the frequency spectrum, it becomes necessary to abandon the utilization of such circuit elements as electron tubes, diodes and transistors, and to apply microwave techniques and elements such as, traveling wave tubes, backward wave oscillators, magnetrons, etc. However, at microwave frequencies, signal amplitudes will usually vary over wide ranges throughout the system In a system employing the pulse no-pulse representation of binary digital data, there is the constant danger that background noise in the presence of a low-level no-pulse digital representation will be mistaken for a pulse digital representation. Consequently, in a data processing system employing pulse no-pulse representation of binary digital data, the lowest signal level must be held well above the noise level; thus, the minimum number of active circuit elements required to maintain this relatively high signal level is unduly large for a given allowable error rate.

On the other hand, a data processing system employing binary digital representation, wherein the information content of a signal is denoted by the phase of the signal relative to a reference signal, permits the use of fewer active circuit elements for a given error rate. Such a data system is disclosed by Stanley P. Frankel in application Serial No. 769,348, filed October 24, 1958, and assigned to the assignee of the present invention. In that application, a high speed data processing system is shown utilizing microwave techniques, and using phase representation for binary digital data. In the phase representation, binary digits representing data are denoted by the relative phase of electrical signals with respect to a reference signal. Both the binary "1" and the binary "0" are represented by alternating signals of substantially equal amplitude. However, one of these types of binary digits is denoted by a cophasal relationship between the corresponding signals and the reference signal, whereas the other of these types of binary digits is denoted by an anti-phasal relationship between the corresponding signals and the reference signal.

An information storage system for storing information in phase representation must be capable of accurately maintaining the phase relationship of the data stored therein. Information storage systems of the prior art adapted to store information in pulse no-pulse representation are unsuited for storing data in phase representation.

Accordingly, it is a primary object of the present invention to provide a high speed information storage system for storing information in binary digital form.

It is another object of the present invention to provide a high speed information storage system for storing binary digital information in phase representation.

It is another object of the present invention to provide a high speed information storage system for storing binary digital information in phase representation and for maintaining the phase representation while the information is stored therein.

It is still another object of the present invention to provide a high speed information storage system for storing bits of digital information at clock rates in the microwave region of the frequency spectrum.

Further objects and advantages of the present invention will become apparent to those skilled in the art as the description thereof proceeds.

Briefly stated, in accordance with one embodiment of the present invention, an information storage system is provided having an amplifier, an oscillator, and a delay element connected to form a recirculation loop. A continuous alternating electrical signal having information-containing portions in the form of phase represented binary digits is supplied to the amplifier through a hybrid junction. The gain of the amplifier is varied so that only those portions of the electrical signal containing information are amplified. The amplified portions of the electrical signal from the amplifier are applied to an oscillator, hereinafter referred to as the loop oscillator, and force the oscillator output signal into a cophasal relationship with the applied signal. The output signal of the loop oscillator is thus a continuous alternating signal having information-containing portions which are cophasal with the information-containing portions of the original electrical signal applied to the system. The oscillator output is supplied to a second hybrid junction wherein the information stored in the system is made available to external utilization equipment. The second hybrid junction also provides a recirculation path from the loop oscillator to the delay element. The electrical signal containing information in phase representation from the loop oscillator is delayed by the delay element and resupplied to the amplifier through the first hybrid junction. The electrical signal is then amplified and applied to the loop oscillator, and the oscillator continues to produce a constant amplitude output signal having a cophasal relationship with the original binary digital information supplied to the storage system. The information, in binary digital form and in phase representation continues to circulate in the loop and may be retrieved at a predetermined time at a storage system output terminal connected to the second hybrid junction.

The loop oscillator may be stabilized by providing a stabilizing oscillator for supplying a signal to the loop oscillator having a frequency twice that of the loop oscillator frequency. The resulting stabilization of the oscillations of the loop oscillator provide an output signal having a fixed frequency and a phase which may be in cophasal or anti-phasal relationship with a reference signal. Synchronization of the storage system with the data processing system in which the storage system is being used is provided by a source of clock signals which may be utilized to vary the gain of the amplifier and to synchronize the oscillations of the stabilizing oscillator.

The invention, both as to its organization and operation together with further objects and advantages thereof, may best be understood by reference to the following description taken in connection with the accompanying drawings in which.

Figures 1, 2:
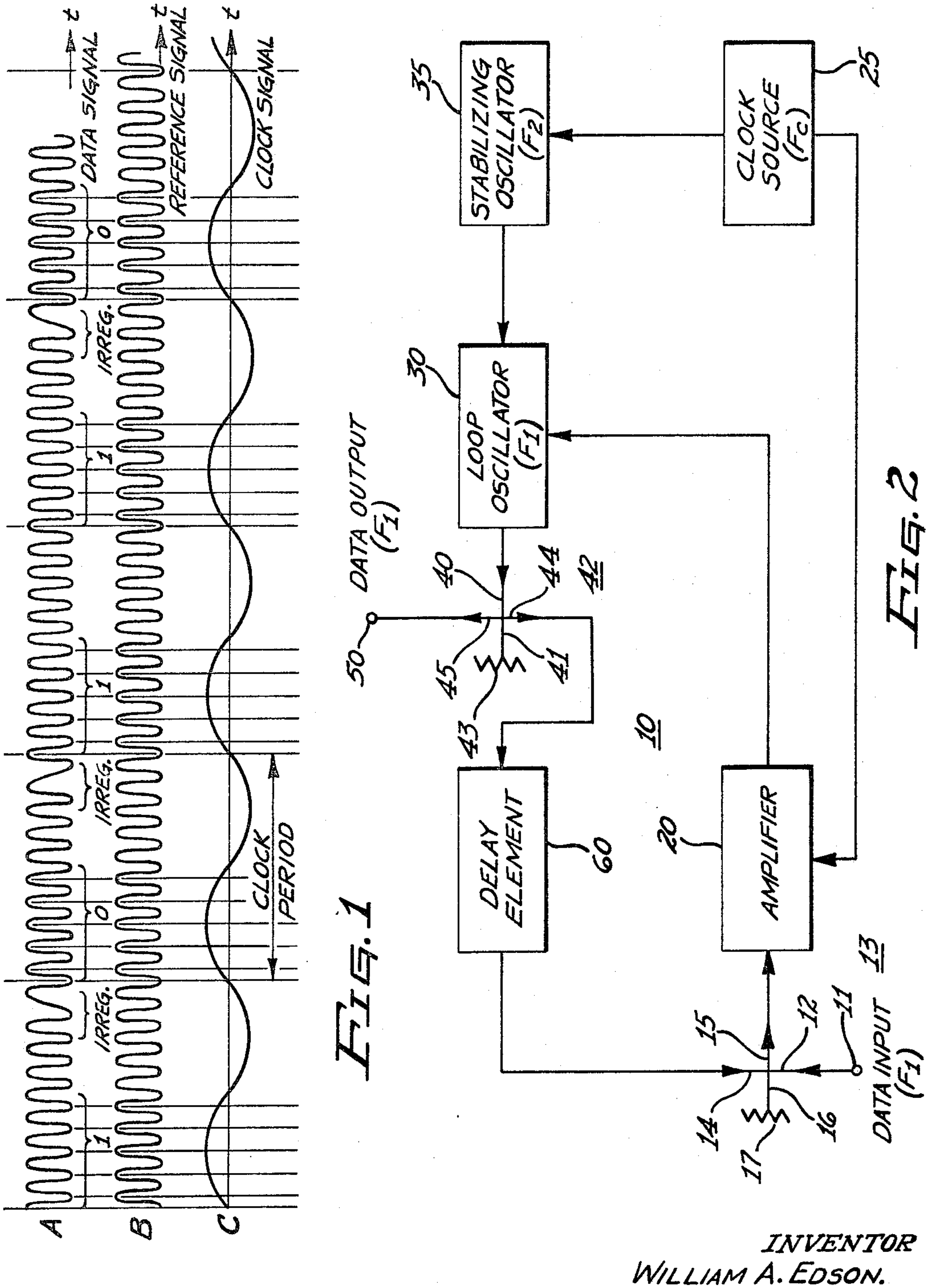
FIG. 1 shows several waveforms illustrating the phase representation of binary digital information utilized in the present invention.
FIG. 2 is a block diagram of a high speed information storage system constructed in accordance with the teachings of the present invention.

To facilitate the description of the present invention, a brief explanation will be given of phase representation of binary digital information as used in the present invention. Referring to FIG. 1, waveform B represents a reference signal which may be generated by a reference oscillator integral with the data processing system and external to the information storage of the present invention. Waveform C illustrates a clock signal which is locked in phase with the reference signal B. A data signal A is shown representing the binary digital word 10110. It may be seen from an inspection of FIG. 1 that a cophasal relationship between the data signal A and the reference signal B is arbitrarily designated a binary "0," whereas an anti-phasal relationship indicates ta binary "1." When a binary bit is different than a preceding bit, that is, when a binary "1" is preceded by a binary "0" or a "0" is preceded by a "1," a period of transition from one phase relationship to another produces an irregularity in the data signal as shown in waveform A. The clock signal C and the reference signal B are synchronized within the data processing system and are therefore in coherent phase relationship; thus, the existence of a binary "1" or a binary "0" in the data signal may be determined during a portion of a clock signal, for example, the positive half cycle of the clock signal. By designating a binary "1" or a binary "0" according to the phase relationship of a data signal with respect to a reference signal during only the positive half cycle of the clock signal, a positive determination of the binary bits may be made without the technical difficulties produced by the irregularities in the data signal when each succeeding bit changes from a "1" to a "0" or from a "0" to a "1." Thus, binary digital information in phase representation provides data signals having a uniform amplitude and a phase which varies in each clock period according to whether a binary "1" or a binary "0" is represented during that clock period.

Referring to FIG. 2, a high speed information storage system constructed in accordance with the teachings of the present invention is shown; the system includes a recirculation loop 10 having a data input terminal 11 for receiving new data for storage in loop 10 connected to one arm 12 of a hybrid junction 13. A suitable hybrid junction for use in the information storage system of FIG. 2 is described by J. F. Reintjes and G. T. Coate, "Principles of Radar," 3rd edition, McGraw-Hill Book Co., Inc., New York, pages 825–839, 1953. A hybrid junction is a device provided with two pairs of conjugate arms and wherein, if the arms are suitably terminated, a signal supplied to one arm of one conjugate pair will divide equally between the two arms of the other conjugate pair, and no portion of the applied signal will enter the other arm of said one conjugate pair. Arms 12 and 14 are one conjugate pair, and arms 15 and 16 the other conjugate pair of hybrid junction 13. A dissipative member 17 properly terminates arm 16; therefore, the data input signal entering arm 12 divides equally between arms 15 and 16 and no portion thereof enters arm 14. That portion of the data input signal entering arm 16 is dissipated in a dissipative number 17 whereas the portion entering arm 15 is applied to the input of an amplifier 20.

Although the Reintjes publication describes hybrid junctions employing coaxial transmission lines and other conventional rectangular wave guide sections, neither hybrid junction 13, nor any of the circuits or components hereinafter described for transmitting or otherwise treating microwave signals of the type herein employed is so limited. Such circuits and components may comprise any known apparatus for propagating electromagnetic waves, such as coaxial transmission lines, hollow wave guides, ridge wave guides, or strip lines.

A data signal, having a frequency $F_1$ is applied to the amplifier 20 and is amplified during the positive half cycle of a clock signal of frequency $F_c$ supplied to the amplifier 20 by a clock source 25. A typical amplifier suitable for use in the system of FIG. 2 may be a helix-type traveling wave tube. Such tubes exhibit desirably broad band amplification, and provide a convenient means for amplifying signals in the microwave region of the frequency spectrum. The gain of such an amplifier may be varied to provide amplification only during the positive half cycle of an applied clock signal by suitably biasing the traveling wave tube. For example, one means for achieving the desired control is to use a conventional grid near the cathode of the traveling wave tube. Control may also be achieved by varying the potential on an accelerating anode near the cathode of the tube. Still another means for achieving control of a helix-type traveling wave tube is to sever the helix near the cathode end of the tube in such a way as to allow a separate bias to be applied but to provide RF signal continuity. The amplified data signal is applied to a loop oscillator 30. Loop oscillator 30 may be any type of oscillator suitable for producing alternating signals having a frequency in the microwave region of the frequency spectrum such as, for example, reflex klystrons, backward wave oscillators, etc. The frequency $F_1$ of the loop oscillator 30 is stabilized by a stabilizing frequency $F_2$, equal to twice the frequency $F_1$, supplied by a stabilizing oscillator 35. The stabilizing oscillator 35 is synchronized with the amplifier 20 by the application of clock signals from clock source 25. Therefore, the entire storage system is synchronized by clock signals from the clock source 25. The frequency of the clock signal $F_c$ may be adjusted to coincide with the desired clock rate of the data processing system in which the storage system is being used. Thus, clock signal $F_c$ may be the clock source of the data processing system.

The output signal of the loop oscillator 30 is applied to one arm 40 of a conjugate pair of arms 40 and 41 of a hybrid junction 42. Conjugate arm 41 is terminated in a dissipative member 43. The loop oscillator output applied to arm 40 is thus equally divided between conjugate arms 44 and 45. Information may be retrieved from the storage system by suitably sensing the data signal presented to the terminal 50 from the arm 45. A delay element 60 is connected to receive the loop oscillator output from arm 44 of the hybrid junction 42. The delay element 60 is adapted to delay the output of the loop oscillator 30 for a time sufficient to accommodate the continuous storage in loop 10 of a predetermined number of bits and apply the delayed signal to arm 14 of hybrid junction 13. The signal arriving at arm 14 is thus divided equally between conjugate arms 15 and 16; that portion of the signal following arm 16 is dissipated in dissipative member 17, and that portion following arm 15 is applied to the amplifier 20 for recirculation in loop 10.

As mentioned previously in connection with FIG. 1, the information-containing portions of the data signal may be separated by periods of irregularity. Since the amplifier amplifies only during the positive half-cycle of the applied clock signal, the information-containing portions of the data signal may be amplified without amplifying the irregular portions. However, when loop oscillator 30 is forced to change phase to coincide with the phase of the amplified data signal supplied by the amplifier 20, irregularities may again be generated in the circulating signal. To prevent build up of these irregular portions of the circulating signal, the delay element 60 is adjusted to provide a total loop recirculation time that is slightly less than the time required for all of the circulating signals (i.e., all the bits of the stored information) to pass a given point in the loop. For example, if the five bit word of FIG. 1, 10110, were to be stored in the system of FIG. 2, the five bits would recirculate in the recirculation loop 10. The delay element would then be adjusted to provide a total loop recirculation time slightly less than five clock periods. Each bit would then be amplified, applied to loop oscillator 30, delayed in delay element 60, and would arrive once again at amplifier 20 slightly less than five clock periods later. If a four-bit word were to be stored, the delay element would then be adjusted to provide a total loop recirculation time slightly less than four clock periods, and so on. Since the amplifier amplifies only during the positive half cycle of the clock signal, that part of the recirculating data signal that arrives at the amplifier before the clock signal becomes positive is not amplified. Therefore, since the irregularities in the recirculating data signal occur slightly before each information-containing portion or bit, the irregularities are not amplified and are thereby prevented from building up.

Figure 3:
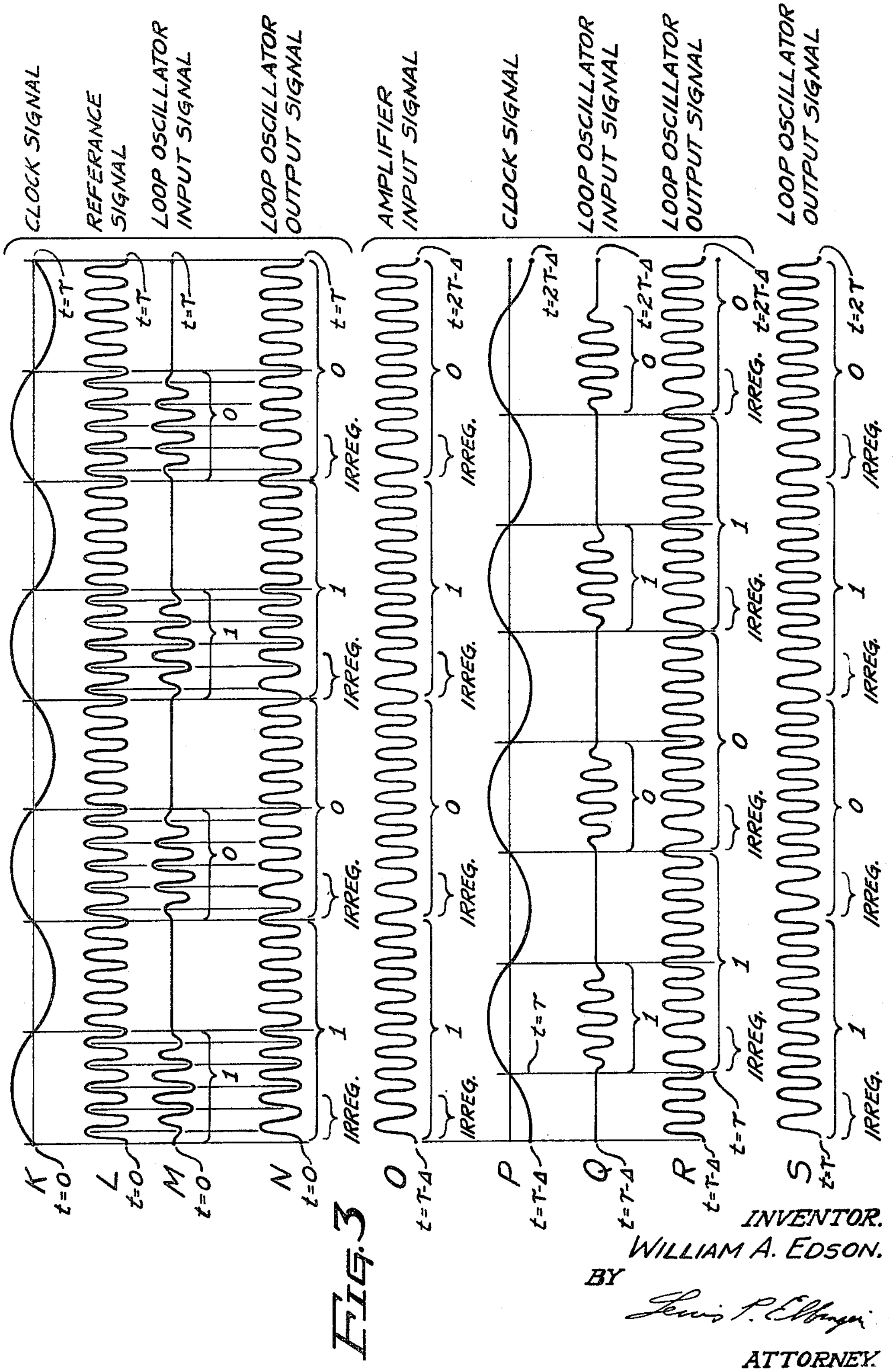
FIG. 3 shows several waveforms present at various points in the storage system of FIG. 2.

The operation of the storage system of FIG. 2 will now be given in connection with the wave forms of FIG. 3. By way of example, the total loop delay time is sufficient for the loop to store four circulating bits in phase representation. A data signal is applied to the amplifier 20 from input terminal 11 through arms 12 and 15 of hybird junction 13. Amplifier 20 amplifies only that portion of the data signal occurring during the positive half cycle of the clock signal. The clock signal, applied by the clock source 25, operates to vary the gain of amplifier 20 thereby producing an output from amplifier 20 in the form of pulses of a frequency $F_1$ and recurring at frequency $F_c$ but having a phase relationship with respect to a reference signal corresponding to the information contained in the pulse, i.e., a binary "1" or a binary "0." Waveforms K and L of FIG. 3 illustrate respectively the clock and reference signals following a predetermined time of operation, denoted in this figure as $t=0$. The output signal of the amplifier 20 is applied to oscillator 30 and is of sufficient amplitude to force the oscillator into cophasal relation with the amplifier output. If a particular bit signal arriving at oscillator 30 from amplifier 20 is of the same type as the immediately preceding bit signal, the operating phase of oscillator 30 remains unchanged at that time. If the bit signal applied to oscillator 30 is of the opposite type of the immediately preceding bit signal, it arrives 180° out-of-phase with the phase at which the oscillator 30 is operating. This applied signal is of sufficient amplitude to cause oscillator 30 to change the phase of its oscillations by 180° and continuously provide an output signal in phase representation corresponding to the data signal applied to the oscillator input. Each digital representation in the signal applied to oscillator 30 occurs in the first half, or positive half, of a clock period as explained previously. Waveform M of FIG. 3 shows the signal input to oscillator 30. This wave form comprises a series of microwave pulses, the phase of the microwave signal in each pulse denoting the bit represented thereby. Thus, the first and third pulses bear an antiphasal relationship with the reference signal and so represent binary "1's," whereas the second and fourth pulses bear a cophasal relationship with the reference signal and represent binary "0." Consequently, the storage signal represents the binary number 1010.

The oscillator output is applied to a hybrid junction 42 which provides two paths for the output signal; first, the output signal is supplied to an output terminal 50 for utilization in the data processing system, and second, the output signal is applied to a delay element 60 prior to being recirculated in the recirculation loop 10. The phase of the oscillator output signal of waveform N is locked with that of the signal of waveform M, when pulses are present in waveform M. In the instant example, the phase of waveform M changes for each pulse and correspondingly the oscillator output signal of waveform N must alter its phase in each successive bit.

Consider the first binary "0" of waveform N. Immediately prior to the appearance of the signal representing this "0," the loop oscillator is operating 180° out-of-phase with the reference oscillator and is representing a binary "1." Upon application of the binary "0" pulse representation of waveform M to oscillator 30, the phase thereof is changed to correspond to that of the applied pulse. Thus, after a few cycles of oscillation the phase of oscillator 30 becomes stabilized in its new relationship with the reference signal, and represents a binary "0." The cycles during which the phase is changing are denoted as the regions of phase irregularity in waveform N. In these intervals of phase irregularity, the oscillator output signal does not provide useful digital representation. However, in the remainder of the clock period following the interval of irregularity, the phase is stabilized and useful for denoting the corresponding binary digit.

The storage system of FIG. 2 prevents a cumulative increase in the number of cycles of phase irregularity in each bit by providing that the total loop recirculation time is slightly less than the time required for the recirculating information to pass a given point in the loop, in other words, is less than an integral number of clock periods by a small fraction of a clock period. This deviation allows the controllable amplifier 20 to suppress the irregular first portions of each stored bit. The total loop delay of a storage element is $\tau-\Delta$, where $\tau$ is the clock period times the number of bits being stored, and $\Delta$ is a small fraction of a clock period. In the example chosen for illustration, $\tau$ equals four clock periods and $\Delta$ equals approximately one-quarter of a clock period. For simplicity it is assumed that delay element 60 accounts for the entire loop delay. The delay of element 60 may be correspondingly decreased to compensate for any delay occurring in the remainder of the loop.

The next set of waveforms, O to R, illustrates the employment of the signal of waveform N after it has passed delay element 60, and arms 14 and 15 of hybrid junction 13. At this time, the first portion of the signal of the waveform N reaches amplifier 20 at time $t=\tau-\Delta$. Waveform O is similar to waveform N except delayed therefrom. Waveform P represents the clock signal from $t=\tau-\Delta$ to $t=2\tau-\Delta$. The clock signal is delivered to amplifier 20, such as to a control grid of the traveling-wave tube thereof, in order to periodically vary the amplifier gain. Sufficient traveling-wave tube control grid bias is supplied with the clock signal so that amplifier 20 only delivers an output signal during positive portions of the clock signal. The traveling-wave tube is cut off during negative clock signal portions. By comparing the clock signal of waveform P with the amplifier input signal of waveform O, it is seen that amplifier 20 passes only the middle portion of each digital signal applied thereto, and effectively suppresses the phase irregular front portion of each digital signal. Therefore, the output signal of amplifier 20, waveform Q, comprises a series of microwave pulses of proper phase to represent the corresponding binary digits. Each pulse of waveform Q commences without phase irregularity at the beginning of a clock period. The oscillator output signal commencing after $T=\tau-\Delta$ is shown in wavefrom R. Waveform R depicts a signal similar to that waveform N, which occurred four clock periods earlier. Waveform R has no more than the same small intervals of phase irregularity at the beginning of each clock period, those necessary for changing the phase of oscillator 30. The output signal of oscillator 30 following time $t=\tau$ is shown in waveform S. Comparing waveform S with waveform N, it is seen that the signals representing binary digital information recirculate in this storage system without degeneration of signal wave shape and without loss of overall time synchronism. The beginning of each bit continues to occur at the beginning of the corresponding clock period, and the relative phase of the alternating microwave frequency remains constant within each information-containing portion of the circulating data signal.

When new data is to be stored in the information storage system, the new data signal may be applied to the input terminal 11, and thereby introduced into the loop 10 through arm 12 of the hybrid junction 13. The data signal already circulating in the loop 10 is simultaneously applied to arm 14 of the hybrid junction 13. Since the data processing system is operating in synchronism with the storage system, the resulting signal applied to amplifier 20 is a result of the algebraic summation of the two signals. The data signal circulating in the loop 10 and applied to arm 14 is attenuated by the time it reaches arm 14 to an amplitude of approximately one-half the amplitude of the new data signal. Therefore, if the new data signal is out-of-phase with the circulating data signal, the algebraic sum will be in phase with, but only half the amplitude of, the new data signal. If the new data signal is in phase with the circulating data signal, the algebraic sum will be in phase with, and one and one-half the amplitude of, the new data signal. It may be seen that the new data to be stored may be injected into the loop and subsequently recirculated by merely applying the new data signal to the terminal 11. The variations in the amplitude of the signal applied to amplifier 20, caused by the application of new data signals to the storage system, may be eliminated by the normal saturation characteristic of the amplifier 20 and the amplifier output signal will be maintained at a constant amplitude.

Figure 4:
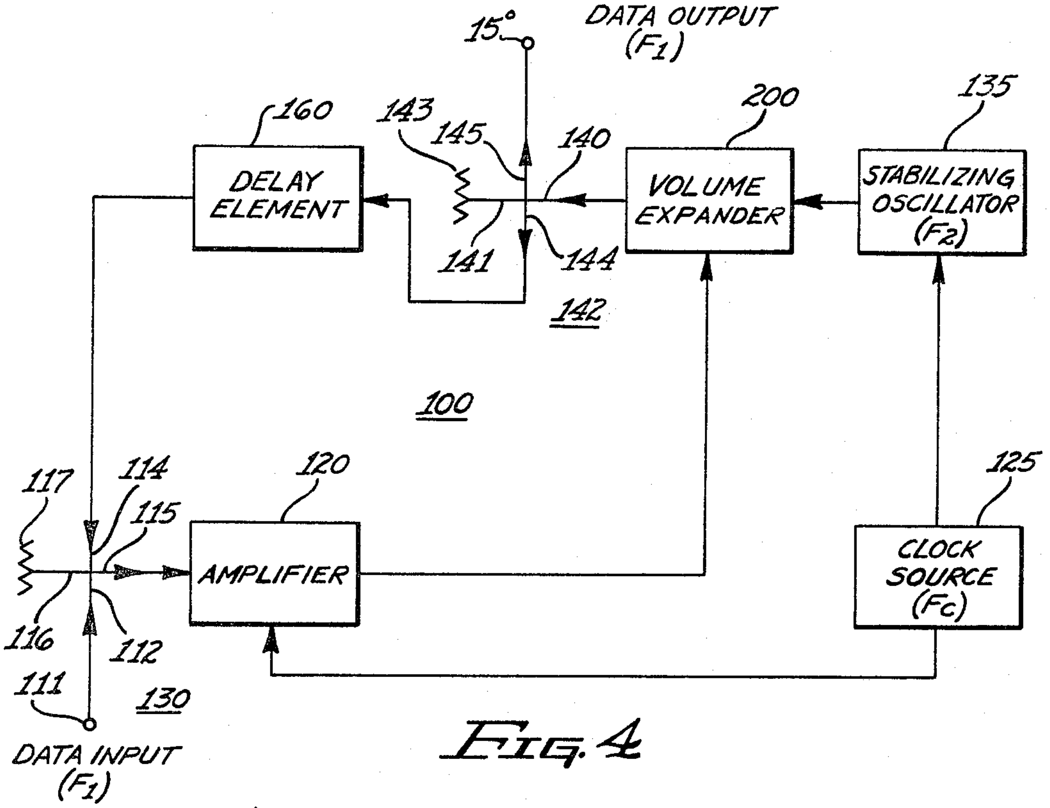
FIG. 4 is a block diagram of a modification of the high speed information storage of FIG. 2.

Referring to FIG. 4, a modification of the information storage system of FIG. 2 is shown utilizing a recirculation loop 100. An amplifier 120 is connected to receive input data signals from arm 115 of a hybrid junction 130. The amplifier gain is controlled by the application of clock signals from a clock source 125. The output of amplifier 120 is applied to a volume expander 200 which provides a higher gain for large amplitude signals than for small amplitude signals. A suitable volume expander for microwave frequencies may comprise a modified helix-type traveling wave tube. The function of volume expansion may be obtained in this type of traveling wave tube by severing the helix in the region of the output end of the tube and applying a higher voltage to the severed portion of the helix than to the input section of the helix. A similar result may be achieved if the helix of a traveling wave tube is provided with a finer pitch near the output end of the tube. Traveling wave tubes, modified in such a manner, provide a means for amplifying the relatively large amplitude signals such as a pulse, while suppressing relatively small amplitude signals such as the noise usually present between pulses. Traveling wave tubes utilizing severed helices are discussed by W. P. G. Klein in "Electrical Communication," pages 255–262, December, 1955.

Stabilization of the information storage system frequency $F_1$ is obtained by the application of a stabilizing frequency $F_2$ to the volume expander 200 from a stabilizing oscillator 135. The stabilizing frequency $F_2$ is twice the frequency $F_1$ and provides a means for maintaining the proper phase relationship thus insuring that a cophasal or anti-phasal data signal will remain in the same relative phase during recirculation. The output of the volume expander 200 is applied to one arm 140 of a conjugate pair of arms 140 and 141 of a hybrid junction 142. Conjugate arm 141 is terminated in a dissipative member 143. The volume expander output signal applied to arm 140 is thus equally divided between conjugate arms 144 and 145. Information may be retrieved from the storage system by suitably sensing the data signal presented to the terminal 150 from the arm 145. Arm 144 is connected to a delay element 160 adapted to delay the output signal of the volume expander 200 and apply the delayed signal to arm 114 of hybrid junction 130.

Figure 5:
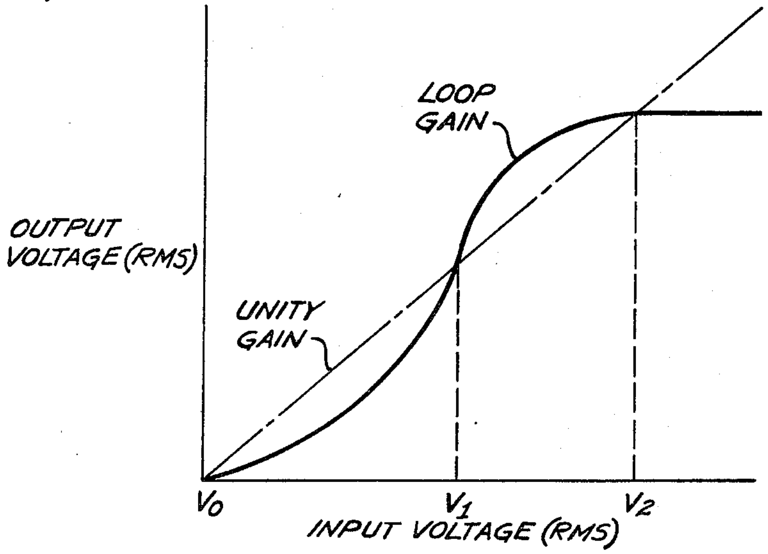
FIG. 5 shows a curve representing a loop gain characteristic of the modification shown in FIG. 4.

The utilization of the volume expander in the recirculation loop 100 of FIG. 4 results in a loop gain such as shown in FIG. 5. An inspection of FIG. 5 reveals that a non-linearity exists in the gain of the recirculation loop 100, and large input voltages will be amplified while small input voltages may be attenuated. That is, the gain provided to the recirculating voltages may be less than 1 for small voltages and greater than 1 for large voltages. Referring to FIG. 5, the loop gain of the recirculation loop 100 of FIG. 4 is shown compared to a unity gain. It may be seen that a small amplitude input voltage, $V_0$ to $V_1$, results in a gain less than 1, whereas large amplitude input voltages, $V_1$ to $V_2$, result in a gain greater than one. The maximum amplitude of recirculation signal voltages is limited by saturation of the amplifier and volume expander as indicated by that portion of the curve beyond $V_2$. Points $V_0$ and $V_2$ are points of stable equilibrium; thus, each circulation of those portions of a signal voltage having an initial amplitude below $V_1$ results in an amplitude reduction until the voltage of those portions is reduced to zero ($V_0$). The information-containing portions of the data signal have voltage amplitudes in excess of the voltage $V_1$; accordingly, a positive voltage gain is afforded to these signals, and each circulation of the signal in the loop 100 will be accompanied by amplification of the information-containing portions of the signal thereby maintaining the amplitude at the saturation level of the amplifier 120 ($V_2$).

Figure 6:
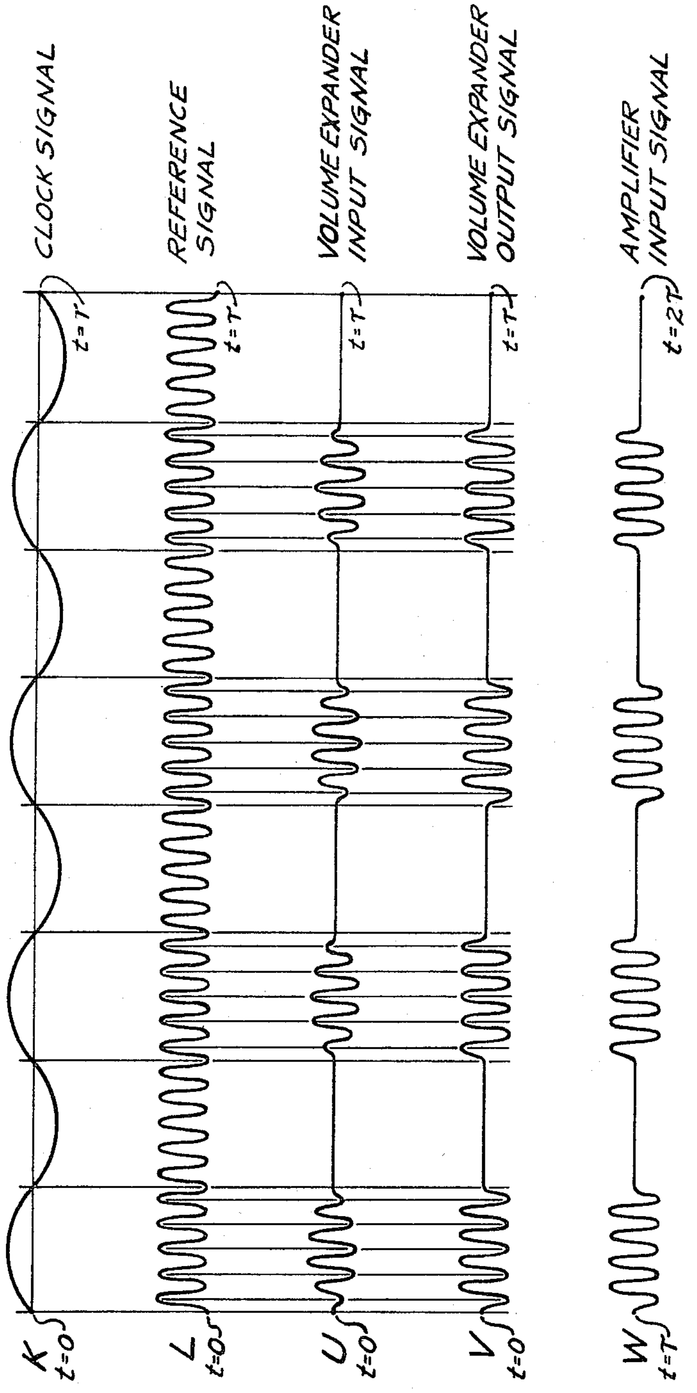
FIG. 6 shows several wave forms present at various points in the storage system of FIG. 4.

A description of the operation of the circuit of FIG. 4 will now be given in connection with the waveforms of FIG. 6. By way of example, the total loop delay time is sufficient for the loop to store four circulating bits in phase representation. Waveforms K and L of FIG. 6 illustrate respectively the clock and reference signals following a predetermined time of operation, denoted in this figure as $t=0$. Waveform U shows the signal input to the volume expander 200 from the amplifier 120. This waveform comprises a series of microwave pulses, the phase of the microwave signal in each pulse denoting the bit represented thereby. Thus, the first and third pulses bear an anti-phasal relationship with the reference signal and so represent binary "1's," whereas the second and fourth pulses bear a cophasal relationship with the reference signal and represent binary "0's." Consequently, the storage signal represents the binary number 1010. Each digital representation in the signal applied to the volume expander 200 occurs in the first half, or positive half, of a clock period as explained previously. The phase of the volume expander output signal of waveform V is locked with that of the signal of waveform U. In the instant example, the phase of the waveform U changes for each pulse and correspondingly the volume expander output signal of waveform V must alter its phase in each successive bit.

The output signal of the volume expander 200, waveform V, is applied to the delay element 160. The delay element 160 is adapted to provide a total loop delay $\tau$ equal to an integral number of clock periods, the number of periods being determined by the number of bits to be recirculated in the loop. In the particular example chosen for illustration, the total loop delay $\tau$ is four clock periods. Waveform W illustrates the volume expander output after a delay equal to $\tau$ and before application to the amplifier 120 for recirculation. It may be seen from an inspection of FIG. 6 that waveforms U, V, and W are similar. That is, the phase of the input signal to the amplifier 120 is similar to the phase of the input signal to the volume expander 200. The output signal of the volume expander is similar to the input signal of the volume expander with the exception that any noise voltages that may exist at the input to the expander are suppressed, and the pulse shapes are modified, by the non-linear loop characteristics caused by the volume expander. Thus, a data signal in phase representation may be applied to the hybrid junction 130 and introduced into the loop 100; the information-containing portions of the data signal, of binary bits, are amplified by the amplifier 120 and stored in the loop in the form of pulses having the proper phase relationship with respect to a reference signal. The volume expander suppresses small amplitude voltages thereby preventing noise voltages from building up and permitting the information containing bits to circulate in the loop 100 until replaced with different information. The microwave frequency of the pulses is stabilized by the stabilizing oscillator, and overall system synchronization is maintained by the clock source 125. To further insure frequency stabilization, it is desirable that the loop gain-frequency response of the recirculation loop 100 have a broad maximum centering on frequency $F_1$.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed as new and desired to secure by Letters Patent of the United States is:

1. An information storage system for storing binary digital information comprising, a recirculation loop including an amplifier and a delay means, means for inserting into said loop an electrical signal having information-containing intervals in the form of binary digits, means for increasing the gain of said amplifier when the information-containing intervals of said electrical signal are received by said amplifier and for decreasing the gain of said amplifier at all other times, and means for retrieving said information from said loop.

2. An information storage system for storing binary digital information in phase representation comprising, a recirculation loop including an amplifier and a delay means, means for inserting into said loop an electrical signal having information-containing intervals in the form of phase represented binary digits, means for increasing the gain of said amplifier when the information-containing intervals of said electrical signal are received by said amplifier and for decreasing the gain of said amplifier at all other times, and means for retrieving said information from said loop.

3. An information storage system for storing information in the form of an electrical signal having discrete information-containing intervals thereof representing binary digits comprising, an amplifier, means for applying said signal to an input terminal of said amplifier, means for increasing the gain of said amplifier when said discrete information-containing intervals are received thereby and for decreasing the gain of said amplifier at all other times, means comprising a delay element for applying the output signals delivered by said amplifier to said input terminal, and means for retrieving said information from said system.

4. An information storage system for storing information in the form of an electrical signal having discrete regularly recurring spaced information-containing intervals thereof representing binary digits comprising, an amplifier, means for applying said signal to an input terminal of said amplifier, means for increasing the gain of said amplifier when said information-containing intervals are received thereby and for decreasing the gain of said amplifier at all other times, signal return means comprising a delay element for applying the output signals delivered by said amplifier to said input terminal, the total delay of said return means and amplifier being equal to a fraction of a period less than an integral number of recurrence periods of said information-containing intervals, and means for retrieving said information from said system.

5. An information storage system for storing binary digital information in phase representation comprising, a recirculation loop including an amplifier and a delay means, means for inserting into said loop an electrical signal of frequency $F_1$ having information-containing intervals in the form of phase represented binary digits, means for increasing the gain of said amplifier when the information-containing intervals of said electrical signal are received by said amplifier and for decreasing the gain of said amplifier at all other times, means for generating a stabilizing signal of frequency $F_2$ and supplying said stabilizing signal to said recirculation loop, said frequency $F_2$ being equal to twice the frequency $F_1$, and means for retrieving said information from said loop.

6. An information storage system for storing binary digital information in phase representation comprising, a recirculation loop including an amplifier and a delay means, said amplifier being adapted to receive an electrical signal having information-containing intervals in the form of phase represented binary digits, a source of clock signals connected to said amplifier for increasing the gain of said amplifier when the information-containing intervals of said electrical signal are received by said amplifier and for decreasing the gain of said amplifier at all other times.

7. An information storage system for storing binary digital information in phase representation comprising, a recirculation loop including an amplifier and a delay means, said amplifier being adapted to receive an electrical signal of frequency $F_1$ having information-containing intervals in the form of phase represented binary digits, means for increasing the gain of said amplifier when the information-containing intervals of said electrical signal are received by said amplifier and for decreasing the gain of said amplifier at all other times, a phase stabilizing element for receiving the information-containing intervals delivered by said amplifier and responsive to a synchronizing signal supplied thereto for synchronizing the phase of said intervals with respect to the phase of said synchronizing signal, means for generating a stabilizing signal of frequency $F_2$, said frequency $F_2$ being equal to twice the frequency $F_1$, and means for applying said stabilizing signal to said phase stabilizing element.

8. An information storage system for storing binary digital information in phase representation comprising, a recirculation loop including an amplifier and a delay means, said amplifier being adapted to receive an electrical signal of frequency $F_1$ having information-containing intervals in the form of phase represented binary digits, a source of clock signals connected to said amplifier for increasing the gain of said amplifier when the information-containing intervals of said electrical signal are received by said amplifier and for decreasing the gain of said amplifier at all other time, means for generating a stabilizing signal of frequency $F_2$ and applying said stabilizing signal to said recirculation loop, said frequency $F_2$ being equal to twice the frequency $F_1$.

9. An information storage system for storing an information bearing signal by recirculation of said signal, said signal consisting of $n$ successively occurring periods of equal duration, each of said periods comprising an information-containing interval in phase representation; said system comprising: a recirculation loop for storing said signal, said loop having a total loop delay time equal to a fraction of a period less than $n$ of said periods, means for inserting said signal into said loop, and means for retrieving said signal from said loop.

10. The system of claim 9 wherein said loop delay time is greater than $n-1$ of said periods.

11. An information storage system for storing binary digital information comprising, a recirculation loop including an amplifier and a delay means, means for inserting into said loop an electrical signal having information-containing intervals in the form of binary digits, means for increasing the gain of said amplifier when the information-containing intervals of said electrical signal are received by said amplifier and for decreasing the gain of said amplifier at all other times, said recirculation loop having a total loop delay time equal to a fraction of an interval less than an integral number of said intervals, and means for retrieving said information from said loop.

12. An information storage system for storing binary digital information in phase representation comprising, a recirculation loop including an amplifier and a delay means, means for inserting into said loop an electrical signal of frequency $F_1$ having information-containing intervals in the form of phase represented binary digits, means for increasing the gain of said amplifier when the information-containing intervals of said electrical signal are received by said amplifier and for decreasing the gain of said amplifier at all other times, means for generating a stabilizing signal of frequency $F_2$ and supplying said stabilizing signal to said recirculation loop, said frequency $F_2$ being equal to twice the frequency $F_1$, said recirculation loop having a total loop delay time equal to a fraction of an interval less than an integral number of said intervals, and means for retrieving said information from said loop.

13. An information storage system for storing binary digital information in phase representation comprising, a recirculation loop including an amplifier and a delay means, said amplifier being adapted to receive an electrical signal of frequency $F_1$ having information-containing intervals in the form of phase represented binary digits, means for generating a stabilizing signal of frequency $F_2$ and supplying said stabilizing signal to said recirculation loop, said frequency $F_2$ being equal to twice the frequency $F_1$, a source of clock signals connected to said amplifier for increasing the gain of said amplifier when the information-containing intervals of said electrical signal are received by said amplifier and for decreasing the gain of said amplifier at all other times, said recirculation loop having a total loop delay time less than the time required for the recirculating information to pass any points in said recirculation loop.

14. An information storage system for storing binary digital information in phase representation comprising, an amplifier, an oscillator, and a delay element connected to form a recirculation loop, means for inserting into said loop an electrical signal having information-containing intervals in the form of phase represented binary digits, means for increasing the gain of said amplifier when the information-containing intervals of said electrical signal are received by said amplifier and for decreasing the gain of said amplifier at all other times, and means for retrieving said information from said loop.

15. An information storage system for storing binary digital information in phase representation comprising, an amplifier, an oscillator and a delay element connected to form a recirculation loop, means for inserting into said loop electrical signal having information-containing intervals in phase representation for recirculation in said loop, means for increasing the gain of said amplifier when the information-containing intervals of said electrical signal are received by said amplifier and for decreasing the gain of said amplifier at all other times, said recirculation loop having a total loop delay time equal to a fraction of an interval less than an integral number of said intervals, and means for retrieving said information from said loop.

16. An information storage system for storing binary digital information in phase representation comprising, an amplifier, an oscillator and a delay element connected to form a recirculation loop, means for inserting into said loop an electrical signal having information-containing intervals for recirculation in said loop, said information-containing intervals comprising phase represented binary digits, means for increasing the gain of said amplifier when the information-containing intervals of said electrical signal are received by said amplifier and for decreasing the gain of said amplifier at all other times, said oscillator having a frequency of oscillation equal to the frequency of said electrical signal and adapted to oscillate in phase with the amplified information-containing intervals of said electrical signal, and means for retrieving said information from said loop.

17. An information storage system for storing binary digital information in phase representation comprising, an amplifier, an oscillator and a delay element connected to form a recirculation loop, means for inserting into said loop an electrical signal having information-containing intervals for recirculation in said loop, said information-containing intervals comprising phase represented binary digits, means for increasing the gain of said amplifier when the information-containing intervals of said electrical signal are received by said amplifier and for decreasing the gain of said amplifier at all other times, said oscillator having a frequency of oscillation equal to the frequency of said electrical signal and adapted to oscillate in phase with the amplified information-containing intervals of said electrical signal, said recirculation loop having a total loop delay time equal to a fraction of an interval less than an integral number of said intervals, and means for retrieving said information form said loop.

18. An information storage system for storing simultaneously by recirculation $n$ binary digits of information, each binary digit having a duration D, comprising: a recirculation loop having a total loop delay time less than $n$D, means for inserting signals representing $n$ of said binary digits into said loop, and means for retrieving signals representing all of said $n$ binary digits stored in said loop.

19. An information storage system for storing binary digital information in phase representation including, a recirculation loop comprising, means for inserting into said loop an electrical signal having information-containing intervals in phase representation for recirculation in said loop, an amplifier a delay means adapted to provide a total loop delay time equal to the time required for all of said recirculating information-containing intervals of said electrical signal to pass any point in said recirculation loop, and means external to said recirculation loop for increasing the gain of said amplifier when the information-containing intervals of said electrical signal are received by said amplifier and for decreasing the gain of said amplifier at all other times.

20. An information storage system for storing binary digital information in phase representation including, a recirculation loop comprising, an amplifier adapted to receive an electrical signal having information containing intervals for recirculation in said loop, a volume expander connected to receive the amplified information-containing intervals of said electrical signal from said amplifier, and a delay element connected to said amplifier and to said volume expander and adapted to provide a total loop delay time equal to the time required for all of said recirculating information-containing intervals of said electrical signal to pass any point in said recirculation loop.

21. An information storage system for storing binary digital information in phase representation including, a recirculation loop comprising, an amplifier adapted to receive an electrical signal having information-containing intervals for recirculation in said loop, a volume expander connected to receive the amplified information-containing intervals of said electrical signal from said amplifier a delay element connected to said amplifier and to said volume expander and adapted to provide a total loop delay time equal to the time required for all of said recirculating information-containing intervals of said electrical signal to pass any point in said recirculation loop, and means external to said recirculation loop for increasing the gain of said amplifier when the information-containing intervals of said electrical signal are received by said amplifier and for decreasing the gain of said amplifier at all other times.

22. An information storage system for storing simultaneously by recirculation $n$ binary digits of information in phase representation, each binary having a duration D, comprising: a recirculation loop, means for coupling signals representing $n$ of said binary digits in phase representation to said loop for recirculation therein, said recirculation loop having a total loop delay time less than $nD$, and means for retrieving signals representing all of said $n$ binary digits stored in said loop.

23. An information storage system for storing an information signal by recirculation of said signal, said signal consisting of $n$ successively occurring periods of duration D, each of said periods comprising an information-containing interval; said system comprising: a recirculation loop for storing said signal, said loop having a total loop delay time equal to $nD-\Delta$, where $\Delta$ equals a fraction of D, means for inserting said signal into said loop, and means for retrieving said signal from said loop.

References Cited by the Examiner

UNITED STATES PATENTS

| | | | |
|---|---|---|---|
| 2,601,289 | 6/1952 | Hollabaugh | 340—173 |
| 2,961,535 | 11/1960 | Lanning | 333—29 |
| 2,990,515 | 6/1961 | Munster | 333—29 |
| 2,991,425 | 7/1961 | Lundry | 333—29 |

BERNARD KONICK, *Primary Examiner.*

IRVING L. SRAGOW, *Examiner.*

T. W. FEARS, *Assistant Examiner.*